United States Patent
Zenker et al.

(10) Patent No.: US 6,712,176 B2
(45) Date of Patent: Mar. 30, 2004

(54) HYDRAULIC DUAL CIRCUIT STEERING SYSTEM

(75) Inventors: Siegfried Zenker, Kirchseeon (DE); Carsten Christensen, Broager (DK)

(73) Assignee: Sauer-Danfoss Holding A/S, Nordborg (DK)

(*) Notice: Subject to any disclaimer, the term of this patent is extended or adjusted under 35 U.S.C. 154(b) by 0 days.

(21) Appl. No.: 09/749,840

(22) Filed: Dec. 27, 2000

(65) Prior Publication Data

US 2001/0004032 A1 Jun. 21, 2001

(51) Int. Cl.$^7$ ................................................ B62D 5/00
(52) U.S. Cl. ........................... 180/403; 60/403; 91/509
(58) Field of Search .......................... 180/403; 60/403, 60/425, 468; 91/509, 510

(56) References Cited

U.S. PATENT DOCUMENTS

| | | | |
|---|---|---|---|
| 4,257,311 A | * 3/1981 | Barnsley et al. | 91/510 |
| 4,422,290 A | * 12/1983 | Huffman | 180/403 |
| 4,470,259 A | * 9/1984 | Miller et al. | 180/403 |
| 4,553,389 A | * 11/1985 | Tischer et al. | 180/403 |
| 5,020,618 A | * 6/1991 | Nagao | 180/403 |
| 5,215,158 A | * 6/1993 | Pedersen | 180/403 |
| 6,102,150 A | * 8/2000 | Bohner et al. | 180/403 |
| 6,131,687 A | * 10/2000 | Leidinger et al. | 180/403 |

* cited by examiner

Primary Examiner—Daniel G. DePumpo
(74) Attorney, Agent, or Firm—Barnes & Thornburg

(57) ABSTRACT

The invention concerns a hydraulic dual circuit steering system with first circuit having a first control unit and a first steering motor connected with the control unit via working connections, a second circuit having a second control unit and a second steering motor connected with the control unit via working connections, a changeover valve, which in a first position activates the first circuit and deactivates the second circuit and in a second position activates the second circuit and deactivates the first circuit. To improve the steering behaviour, in the first position of the changeover valve the working connections of the second circuit and in the second position of the changeover valve the working connections of the first circuit are connected with a pressure source.

11 Claims, 2 Drawing Sheets

HYDRAULIC DUAL CIRCUIT STEERING SYSTEM

BACKGROUND OF THE INVENTION

The invention concerns a hydraulic dual circuit steering system with
- a first circuit having a first control unit and a first steering motor connected with the control unit via working connections,
- a second circuit having a second control unit and a second steering motor connected with the control unit via working connections,
- a changeover valve, which in a first position activates the first circuit and deactivates the second circuit and in a second position activates the second circuit and deactivates the first circuit.

A hydraulic dual circuit steering system of this kind is known from DE 196 22 731 C2. The changeover valve short-circuits the working connections of the inactive circuit, so that an operation of the belonging control unit will have no effect on the corresponding steering motor. The switching of the changeover valve occurs on each starting and stopping of the vehicle to prevent the valve from getting stuck. During operation a switching always occurs when the pressure in the first circuit drops, thus suggesting that an error has occurred in this circuit.

The not yet published German patent application DE 198 44 331 also describes a hydraulic dual circuit steering system, in which the changeover valve is electrically operable. Both circuits have different control units. In one circuit the control unit is made up of a hydraulic steering unit. In the other circuit a proportional valve is provided. The inlets of both circuits are constantly exposed to pressure, that is, either each of the circuits has its own pump or the circuits are connected in series, so that the tank connection of the first circuit is connected with the pump connection of the second circuit.

Dual circuit steering systems have actually justified their existence. They contribute substantially to the security of vehicles, which is particularly of great importance in connection with heavy working machines, which are permitted for the public traffic.

In practice, however, problems with the switching between the two circuits may occur from time to time. In the circuit switched to, the working or motor connections were short-circuited, that is, for a period they were not under pressure. Due to the leakages, which cannot be avoided in practice, a somewhat lower pressure exists in the section next to the steering motor, which makes itself felt in connection with the switching, for example by means of a jerk in the vehicle. This jerk occurs in that in the steering motor of the just connected circuit the corresponding pressure has to be built up again. A jerk of this kind may in itself effect a wrong reaction from the driver. Even worse is that a driver often interprets such a jerk as an error signal, which in connection with the jerk often causes the driver to perform "unconscious actions".

SUMMARY OF THE INVENTION

The invention is based on the task of improving the steering behaviour.

In a hydraulic dual circuit steering system as mentioned in the introduction, this task is solved in that in the first position of the change-over valve the working connections of the second circuit and in the second position of the change-over valve the working connections of the first circuit are connected with a pressure source.

Thus, the pressure of the individual steering motor is always kept at a level, which is so high that no significant pressure differences appear when switching from one steering motor to the other. The supply to the working connections is in this connection independent of the position of the individual control unit in the corresponding circuit, that is, the pressure is also maintained, when the corresponding control unit is closed. Thus, no additional time will be required to "fill up" the working connections through the control unit. On the contrary, the pressure is already available here. Particularly when the working connections are short-circuited on deactivation of the circuit, the pressure exerted on the working connections is not expected to cause a change of the reactions, as the higher pressure is available on both sides of the corresponding steering motor. The steering motors can, but must not necessarily, be mechanically connected with each other.

Preferably, one LS line serves as pressure source. An LS line is a load sensing line, which usually always carries the highest pressure available in the system. Thus it is ensured that the working connections of the inactive circuit are always held at the highest pressure available in the system. It may be assumed that only a small amount of hydraulic fluid is required to maintain the pressure in the working connections of the inactive circuit, as usually only small amounts of fluid are lost through leakages. The capacity of the load sensing line is therefore sufficient without problems.

Preferably, the pressure source is connected with the inactive circuit via a throttle. The throttle ensures that an error in the inactive circuit, for example a large leakage, will not cause a complete loss of the load sensing pressure in the active system.

In a preferred embodiment it is provided that the changeover valve has a valve element with a short-circuiting path for the working connections of the inactive circuit, which is connected with the pressure source. Thus, the changeover valve is not merely used for the short-circuiting of the individual working connections of the inactive circuit, but also to supply the pressure from the pressure source via this short-circuiting path into the connection between the working connections. On the one hand, this saves unnecessary design efforts, on the other hand, however, ensures the individual function in connection with the switching.

It is also advantageous that a control device is provided, which keeps the second control unit in the neutral position, when the changeover valve is in the first position. This is particularly advantageous when the two control units have different embodiments, that is, the second control unit being, for example, a proportional valve. In this case, the control unit of the second circuit is not moved by a steering movement, so that the working connections through this control unit are blocked, that is, closed. Thus, the working connections of the second circuit form a closed system, which can easily be maintained at the desired pressure.

Preferably, both the changeover valve and the second control unit have an electrical drive. This drive can either work immediately electrically, for example as a magnet drive, or it can work with a hydraulic auxiliary force support, for example in the shape of a bridge circuit, whose one diagonal is supplied with a pressure difference, whereas the other diagonal has a drive for the valve element of changeover valve or control unit, respectively. With an electrical drive of this kind, the desired dependence between the changeover valve and the second control unit can relatively easily be established.

In a particularly preferred embodiment an accumulator is provided, which is, at least in the first position of the changeover valve, connected with the pressure source, thus causing an increase of a supply pressure in the second circuit when the changeover valve is switched. Additionally to the "high" pressure at the working connections of the second circuit, the accumulator also enables an increase of the supply pressure in the second circuit in the moment of switching. This increase must only be effective for a short while. Thus, it is prevented that after the opening of the second control unit a pressure decrease in the working connections of the second circuit takes place through the control unit.

In this connection it is preferred that the change-over valve has an intermediary position between the first and the second position, in which the accumulator is connected with a control line of a pressure supply device of the second circuit. Thus, the accumulator pressure is not directly switched into the supply line, but the control pressure is increased, for example the pressure in the load sensing line for the pressure supply of the second circuit. This gives a much faster reaction of the supply side, which additionally occurs exactly in the instance of the transition from one circuit to the other. When the second circuit is then rendered active, the pressure in this circuit is at the required high level, both on the "working side" and on the "supply side". It may also be provided that the change-over valve remains in the intermediary position for a short period (in the range of milliseconds), so that during this period a connection between the accumulator and the supply device of the second circuit is established. In fact, this period only has to be long enough to enable the accumulator to pass on its pressure accordingly. An alternative to this is that when switching from the first position to the second position, the valve element of the changeover valve permits the corresponding connection for a corresponding period, in spite of the movement.

BRIEF DESCRIPTION OF THE DRAWINGS

In the following, the invention is described in detail on the basis of preferred embodiments in connection with the drawings, showing.

DESCRIPTION OF THE PREFERRED EMBODIMENT

Figure 1:
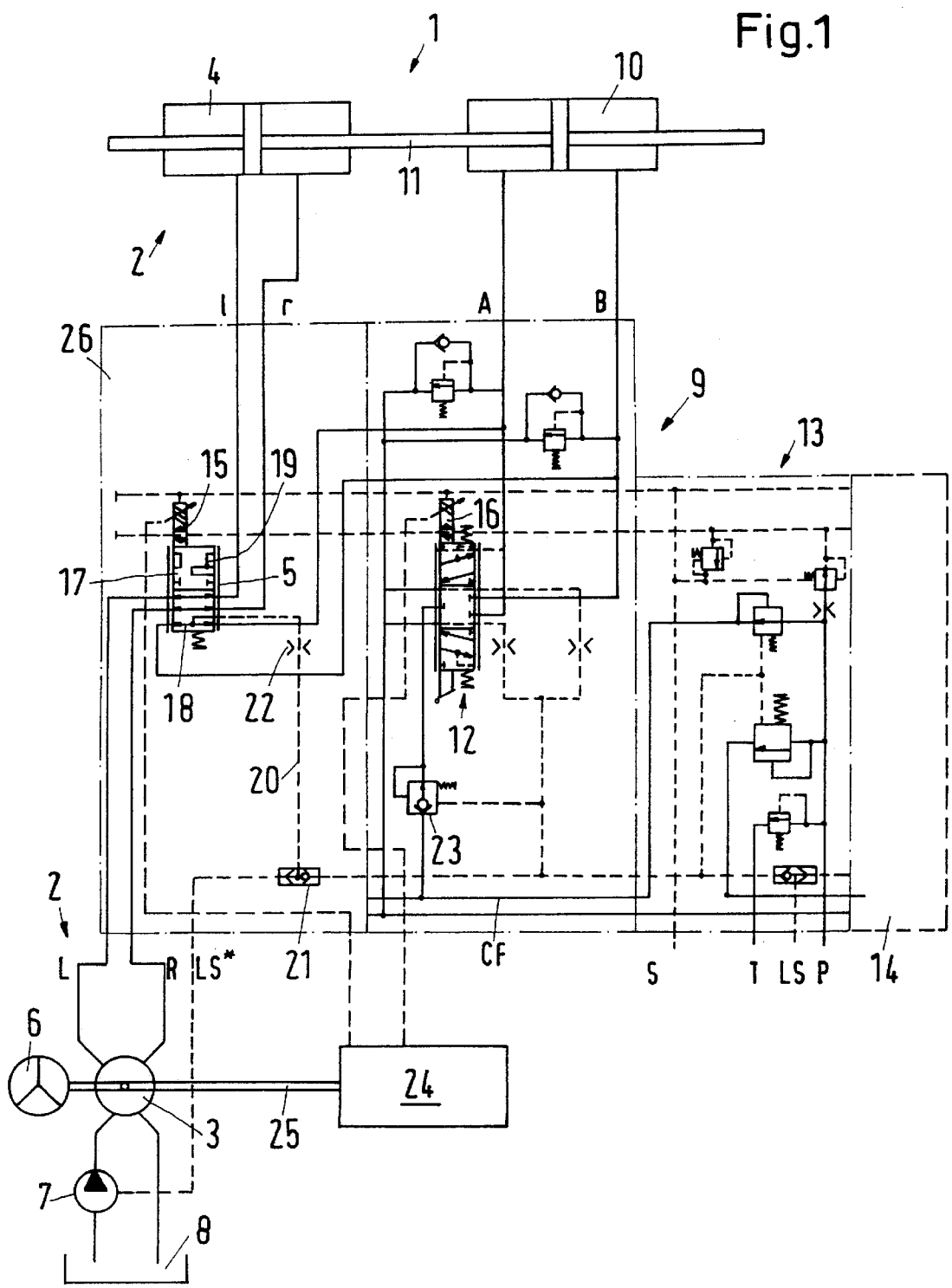
FIG. 1 a first embodiment of a hydraulic dual circuit steering system

FIG. 1 shows a dual circuit steering system with a first circuit 2 having a first control unit 3 and a first steering motor 4, working connections l, r of the steering motor 4 being connected in a module 26 with connections L, R of the control unit 3 via a change-over valve 5, which will be described in detail later. The control unit 3 is operated via a steering handwheel 6, and in dependence of the direction it releases or closes a flow path from a pump 7 to the connections L, R and a return path to a tank 8. Instead of the pump 7 shown, which is responsible for the first circuit 2, a pressure source, which is provided for a complete vehicle, can also be used to supply the required hydraulic pressure via a connection P in the steering system 1. A connection LS* serves as load sensing signal connection for the first circuit 2.

A second circuit 9 also has a steering motor 10, which is connected with the first motor 4 via a connecting rod 11. The second steering motor 10 is connected with a second control unit 12 via working connections A, B, the second control unit 12 being a proportional valve. The second circuit is supplied via a priority valve 13, to which additional hydraulic units 14 (not shown in detail) can be connected. The embodiment of a priority valve 13 is basically known and is therefore not explained. The priority valve 13 is supplied with pressurised hydraulic fluid via a pressure connection P and can return hydraulic fluid to the tank via a connection T. Further, a load sensing connection LS is provided, through which the highest pressure existing in the system can be passed on to a corresponding control means, for example a variable pump or a pressure control valve. An additional connection S is connected directly and permanently with the tank. The difference between the pressures at the connections P and S can be used to control the changeover valve 5 and the second control unit 12 electro-hydraulically, by means of the drives 15, 16.

FIG. 1 shows a first position of the changeover valve 5. In this first position, a valve element 17 connects the working connections l, r of the steering motor 4 with the corresponding connections L, R of the first control unit 3. Further, the two working connections A, B of the second steering motor 10 are short-circuited. When the change-over valve 5 is switched, that is, the valve element lies in the other position, then both the connections L, R of the first control unit 3 and the working connections l, r of the first steering motor 4 are short-circuited, and the connection between the two working connections A, B of the second circuit 9 is broken.

However, in both positions it is provided that the short-circuiting distances 18, 19 made in or by means of the valve element 17, the distances short-circuiting the steering motors 4, 10 in the respective positions of the valve element 17, and being connected with a line 20, which is supplied with the highest occurring load sensing pressure in the system via a change-over valve 21. This load sensing pressure can either be the normal system load sensing pressure, which is available at the connection LS, or it can be the load sensing pressure of the pump 7 or one of the other pressure determining parts of the first circuit 2, which is supplied via the connection LS*. This case (LS*) is preferred, as the pressure ruling here is better suited for meeting the pressure requirement for the steering. The pump 7 is made as a variable pump (not shown in detail). In the line 20 a throttle 22 is arranged, which is dimensioned so that a large leakage of the working connections l, r or A, B, respectively, of the steering motors 4, 10 will not cause a complete loss of the load sensing pressure in the system. Also the control unit 3 can have a connection to LS*.

Accordingly, the working connections A,B or l, r, respectively, of the currently inactive system are supplied with pressure in both positions of the change-over valve 5, thus being held at the highest pressure occurring in the system, so that possible leakages, which appear every now and then, cannot lead to a reduction of the pressure at the working connections A, B or l, r, respectively. When switching the changeover valve 5, the required pressure is immediately available at the activated steering motor 10, 4, so that no time is required for the pressure build-up. This pressure supply is independent of the position or the mode (open or closed, respectively, of the control unit 3, 12 in question. Thus, for example, the second control unit 12 is currently supplied with hydraulic fluid under a predetermined pressure via a line CF and a compensation valve 23, which pressure, however, cannot be led on to the working connections A, B of the second steering motor 10 in the shown neutral position of the second control unit 12. In a manner of speaking, the working connections A, B or l, r, respectively, are supplied with hydraulic fluid surpassing the individual control units 3, 12. Thus, an unpleasant jerk in connection with the switching of the changeover valve 5 is avoided.

A control device 24 is also supplied with control signals from the steering handwheel 6. It is shown that the steering handwheel is connected with the control device 24 via a shaft 25. However, it could also be imagined that electrical or mechanical sensors were available on the steering handwheel, which would supply the control device 24 with the corresponding electrical, hydraulic or pneumatic signals. In a manner not shown in detail, the control device 24 is also connected with the steering motors 4, 10 or the connecting rod 11, respectively, to get information about the factual steering angle, by means of which the second control unit 12 can be operated, so that the second control unit 12 works in a control circuit, which is not shown in detail.

Primarily, however, the control device 24 provides that in the first position of the change-over valve 5 the second control device 12 remains in the neutral position, shown in FIG. 1, so that the working connections A, B of the second steering motor 10 are at least disconnected from the supply via the line CF, however permitting them to maintain their pressure via the line 20. Thus, the working connections A, B are, in a manner of speaking, separated from the remaining system.

Figure 2:
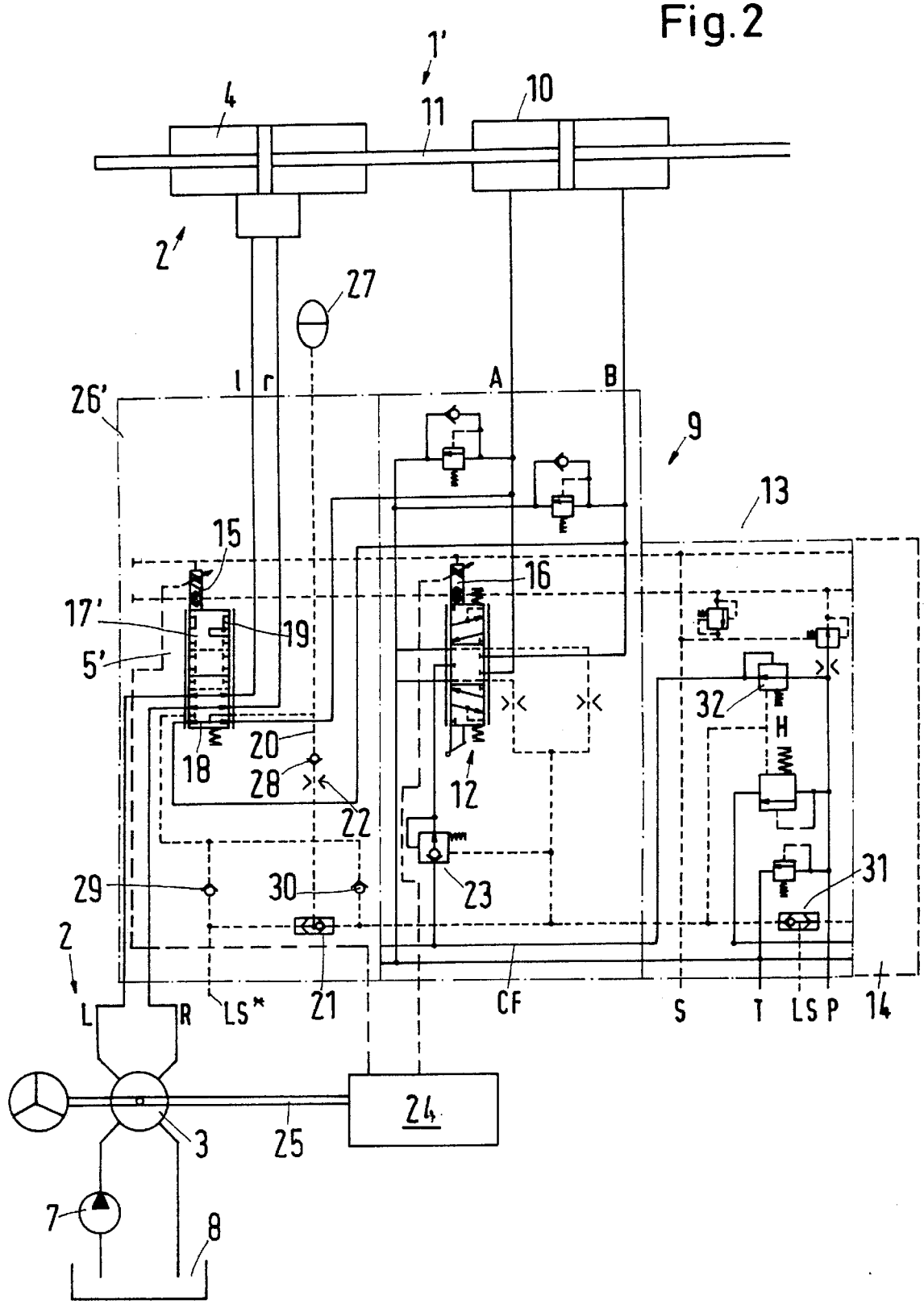
FIG. 2 a second embodiment.

FIG. 2 shows a modified embodiment, in which the same parts have the same reference numbers. Corresponding parts have marked reference numbers.

One modification concerns the changeover valve 5' and thus the module 26', in which the changeover valve 5' is arranged. An accumulator 27 has been inserted, which is connected with the line 20. The accumulator 27 is a pressure store. In the line 20 a non-return valve 28 is arranged, which opens in the direction of the accumulator 27. Thus, the accumulator always stores the highest pressure appearing in the system from the load sensing connections LS or LS*, respectively.

This means that the changeover valve 5' has no longer only two positions, but three positions. The two outer positions on the valve element 17' correspond to the two positions in FIG. 1, that is, in the first position, shown in FIG. 2, of the change-over valve 5', the working connections A, B of the second circuit are short-circuited and are supplied with pressure via the line 20, whereas in the second position the working connections l, r of the first circuit 2 are short-circuited and supplied with pressure.

Between these two positions there is a third position, which the valve element 17' will pass when changing from the first to the second position. If required, it may be provided that the change-over valve 5' remains in this third position for a few milliseconds or that the switching process is controlled so that when moving the valve element 17' from the first to the second position, the connection described below will be maintained for a short while.

In the third position, all working connections l, r and A, B, respectively, are blocked. Merely a connection from the accumulator 27 to a point H in the priority valve 13 exists. Accordingly, this point H is brought up to the pressure in the accumulator 27. However, this is the highest pressure, which has until now occurred in the system. This pressure is passed on via a non-return valve 30 and reaches via a changeover valve 31 in the priority valve 13 also the connection LS and via a non-return valve 29 the connection LS*. Whether the pressure in the accumulator 27 does in fact also appear at the connection LS, of course depends on the pressure that is supplied to the changeover valve 31 from the "other" side, that is, from the other hydraulic units 14. However, this is not critical, as at least the accumulator pressure acts upon the point H, and this pressure increase causes that a valve 32 opens, so that the line CF is supplied with a pressure surge. This pressure surge also reaches the inlet of the second control unit 12. This gives a very fast reaction on the supply side of the second control unit 12, so that also here a pressure drop must not be anticipated, on the contrary, a small pressure increase may even be expected.

This pressure increase occurs exactly in the instant of the switching, that is, when the second circuit 9 gets active, the required pressures are available at both the working connections A, B and the supply line CF.

Also in the opposite case, that is, when switching from the second circuit 9 to the first circuit 2, a pressure surge can in this way be produced in the first circuit 2, which surge then acts upon, for example, the pump 7.

What is claimed is:

1. Hydraulic dual circuit steering system comprising a first circuit having a first control unit and a first steering motor connected with the control unit via working connections, a second circuit having a second control unit and a second steering motor connected with the control unit via working connections, a change-over valve, which in a first position activates the first circuit and deactivates the second circuit and in a second position activates the second circuit and deactivates the first circuit, and in which in the first position of the changeover valve working connections of the second circuit and in the second position of the changeover valve the working connections of the first circuit are connected to a pressure source.

2. Steering system according to claim 1, in which fluid pressure in one load sensing line serves as the pressure source.

3. Steering system according to claim 1, in which the pressure source is connected with the inactive circuit through a throttle.

4. Steering system according to claim 1, in which the changeover valve includes a valve element having a short-circuiting path for the working connections of the inactive circuit, with the inactive circuit connected to the pressure source.

5. Steering system according to claim 1, including a control device.

6. Steering system according to claim 5, in which the control device includes means to keep the second control unit in neutral position, when the changeover valve is in the first position.

7. Steering system according claim 1, in which the changeover valve and the second control unit each include a drive.

8. Steering system according to claim 7, in which the drive is electrical.

9. Steering system according to claim 1, including an accumulator for load pressure.

10. Steering system according to claim 9, in which the accumulator, at least in the first position of the change-over valve, is connected to the pressure source to cause an increase of a supply pressure in the second circuit when the change-over valve is switched.

11. Steering system according to claim 9, in which the change-over valve has an intermediary position between the first and the second position, in which the accumulator is connected to a control line of a pressure supply device of the second circuit.

* * * * *